United States Patent [19]

Pan

[11] Patent Number: 4,734,993

[45] Date of Patent: Apr. 5, 1988

[54] STRAIGHTEDGE

[76] Inventor: Shyh J. Pan, No. 259, Chung Ming South Road, Taichung City, Taiwan

[21] Appl. No.: 883,701

[22] Filed: Jul. 9, 1986

[51] Int. Cl.[4] .............................................. G01B 3/02

[52] U.S. Cl. ........................................ 33/483; 33/494; 33/1 B

[58] Field of Search ................. 33/476, 403, 454, 474, 33/1 B, 1 K, 1 C, 562–566, 41 R, 41 B, 42, 429, 450, 447, 467, 483, DIG. 9, 32.2

[56] References Cited

U.S. PATENT DOCUMENTS

| | | | |
|---|---|---|---|
| 304,245 | 8/1984 | Thomas | 33/483 |
| 629,078 | 7/1899 | Holz | 33/474 |
| 1,544,327 | 6/1925 | Loewenthal | 33/403 X |
| 1,660,624 | 2/1928 | Musham | 33/476 |
| 1,708,551 | 4/1929 | Nell | 33/476 |
| 1,751,366 | 3/1930 | Shaub | 33/476 |
| 4,235,022 | 11/1980 | Aldape | 33/42 X |
| 4,345,383 | 8/1982 | Corsette | 33/47 X |
| 4,565,006 | 1/1986 | Vouyouka | 33/12 X |

FOREIGN PATENT DOCUMENTS

| | | | |
|---|---|---|---|
| 1527692 | 4/1968 | France | 33/403 |
| 467031 | 11/1951 | Italy | 33/476 |

*Primary Examiner*—Harry N. Haroian

*Attorney, Agent, or Firm*—Steinberg & Raskin

[57] ABSTRACT

A transparent straightedge with two L-shaped slots, a multiplicity of vertical and horizontal scales running adjacent to and parallel to the slots, and reference arrows. The L-shaped slots are exactly 90 degrees. Center reference scales in the center portion running vertically. The reference arrows line up with the slots. Opposing scales and center reference scales are all in alignment.

8 Claims, 6 Drawing Sheets

STRAIGHTEDGE

BACKGROUND OF THE INVENTION

This invention relates to an improvement on straightedges and the like. Previously, straightedges have been used to approximate perpendicular lines, extend lines, line up parallel lines, etc. However, these lines are only approximate. Really straight extended lines, really perpendicular lines and really parallel lines are much more time consuming to construct with old-style straightedges. This is due to the fact that the user often only lines up lines by sight, and also due to the fact that when a using an ordinary straightedge, it is difficult to line up the writing instrument at exactly the same distance from the edge of the straightedge every time.

It is the purpose of this present invention, therefore, to mitigate and/or obviate the above-mentioned drawbacks in the manner set forth in the detailed description of the preferred embodiment.

SUMMARY

A primary objective of this invention is to provide an inexpensive method of drawing exactly straight or square (perpendicular) lines without line-up error.

Another objective of this invention is to provide a straightedge with opposite horizontal and vertical scales which are coincident so as to allow convenient and accurate line drawing means.

A further objective of this invention is to provide a straightedge which can be used to simplify the process of making perfectly square rectangles.

The present invention is directed to an improved straightedge comprising: two L-shaped slots, four reference arrows, a multiplicity of vertical scales in the center portion of said improved straightedge;

- said L-shaped slots each comprising a horizontal slot and a vertical slot and also facing each other so that the horizontal slots are parallel to each other and so that the vertical slots are parallel to each other;
- said reference arrows being collinear with said horizontal or vertical slots and also extending to the edge of said improved straightedge;
- said improved said straightedge being transparent.

All scales are preferably in metric.

Other objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENTS

Figure 1:
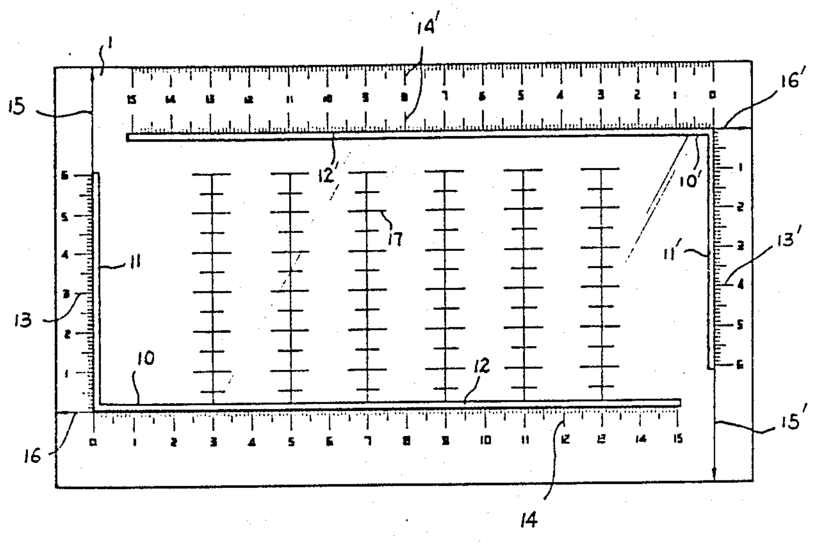
FIG. 1 is an elevational view of the present invention.

Referring to FIG. 1, it can be seen that the present invention comprises two L-shaped slots 10 and 10', four reference arrows (15, 15', 16, and 16') two horizontal scales 14 and 14', two vertical scales 13 and 13', and a multiplicity of central scales 17.

Figure 2:
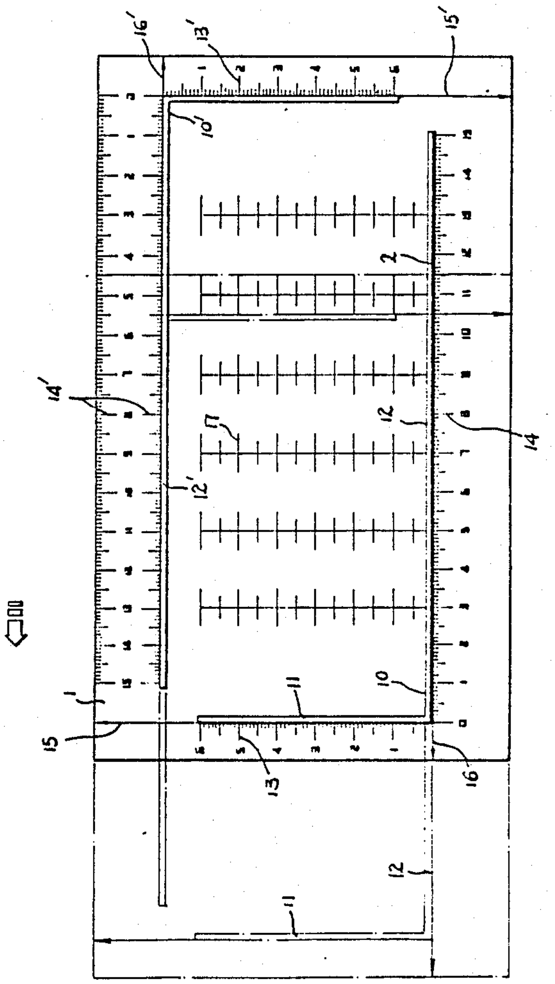
FIG. 2 is a working view of the present invention, showing how lines can be extended.

Each of the L-shaped slots 10 has a vertical portion 11 and 11' and a horizontal portion 12 and 12'. Referring to FIG. 2, it can be seen that the horizontal portion 12 can be used to extend long lines by simply sliding the improved straightedge 1 to the left or right and lining up the slot portion 12 with part of the original line 2.

Figure 3:
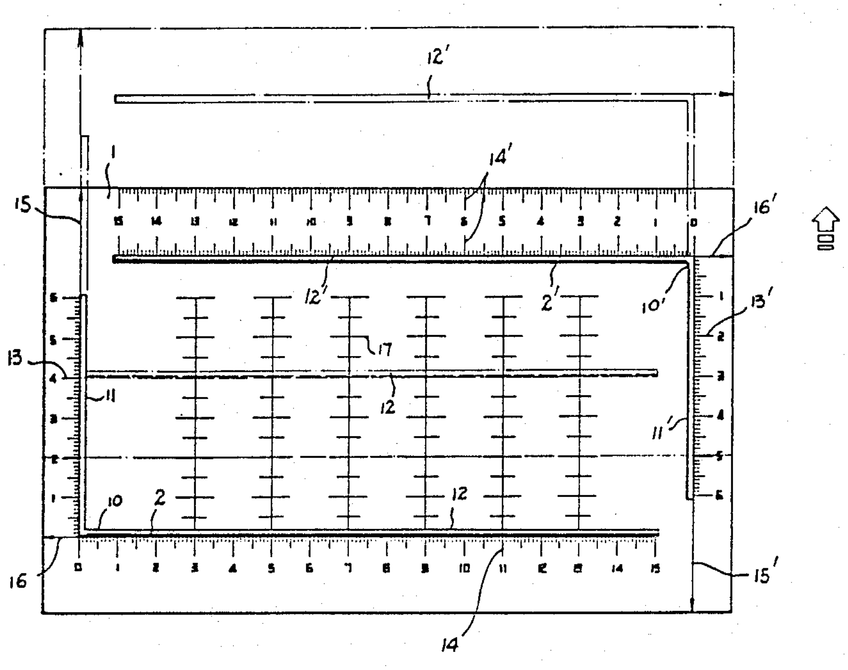
FIG. 3 is a working view of the present invention, showing how parallel lines can be drawn along the Y-axis.

Referring to FIG. 3, it can be seen that any kind of parallel line, whether closely spaced or widely spaced, can be easily and precisely drawn using the present invention 1. For widely spaced parallel lines, an original line 2 and a reference line 2' are drawn. The reference line 2' should be pencilled in lightly so that it is easy to erase later. Next, the present invention 1 should be slid upwards so that the upper horizontal slot 12' is in position to draw a line parallel to the original line 2. The reference line 2' is used along with the vertical scales 17 in the center of the present invention 1. This ensures a line which is exactly parallel with the original line 2, even though they are separated by a wide gap. Closely spaced parallel lines are even easier to draw. For instance, if the original line drawn is 2', then the present invention is simply solid upwards until the lower horizontal slot 12 is the desired distance from the original line 2'. Then, the vertical scales 17 in the center portion of the present invention can be used to exactly line up with the original line 2' and the new closely spaced parallel line can be drawn.

Figure 4:
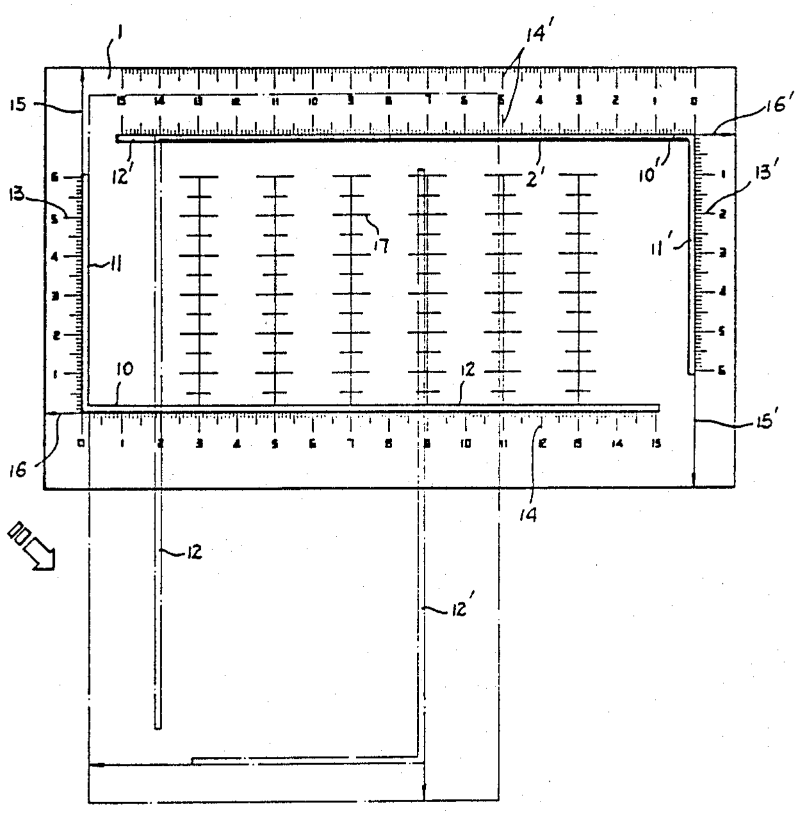
FIG. 4 is a working view of the present invention, showing how large rectangles or squared-off (perpendicular) lines can be easily constructed.

Now referring to FIG. 4, it can be seen that the present invention 1 can be used to draw perpendicular lines. Of course, small perpendicular lines can be drawn directly in the L-shaped slots. But larger perpendicular lines can be drawn by first drawing an original line, say 2', and then sliding the present invention in a counterclockwise manner, as shown in FIG. 4. In this case, reference arrow 15' may be used to exactly line up vertical slot 11' with the original line 2'. Then, a long perpendicular line can be drawn in slot 12 which is exactly perpendicular to the original line.

Figure 5:
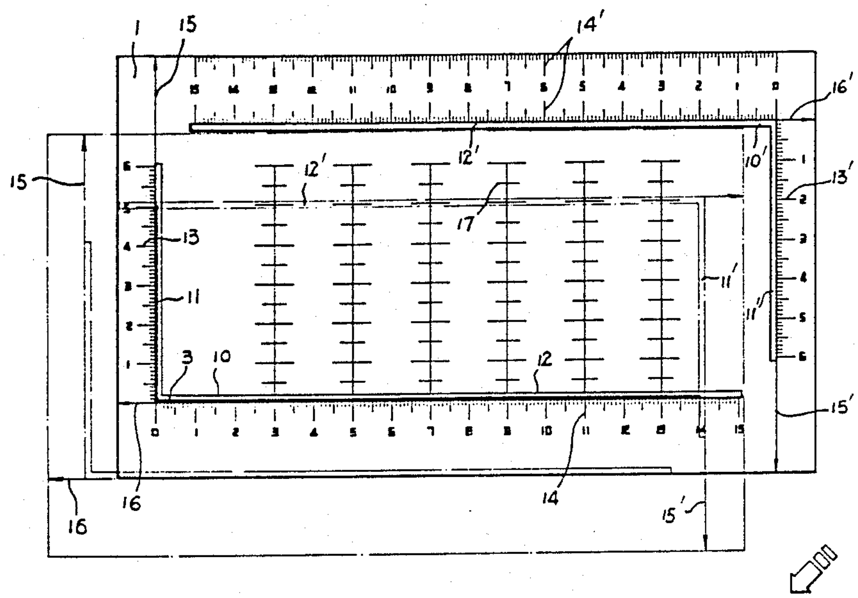
FIG. 5 is a working view of the present invention, showing how rectangles can be quickly and easily constructed.

Referring to FIG. 5, it can be seen that rectangles are quickly and precisely drawn using the present invention 1. Just draw the left-hand side and the bottom of the rectangle in slots 11 and 12 as shown by line 3. Then the improved straightedge 1 can be translated to the new position which is catty-corner to the original position. As seen from FIG. 5, in this new position, the top horizontal slot 12' touches the top left-hand end of the line three and the vertical slot 11' touches the right end of line 3, thus forming a rectangle. Again, the vertical scales 17 in the center portion of the improved straightedge are used to make sure that the new position of the improved straightedge 1 is exactly square with the original line 3.

Figure 6:
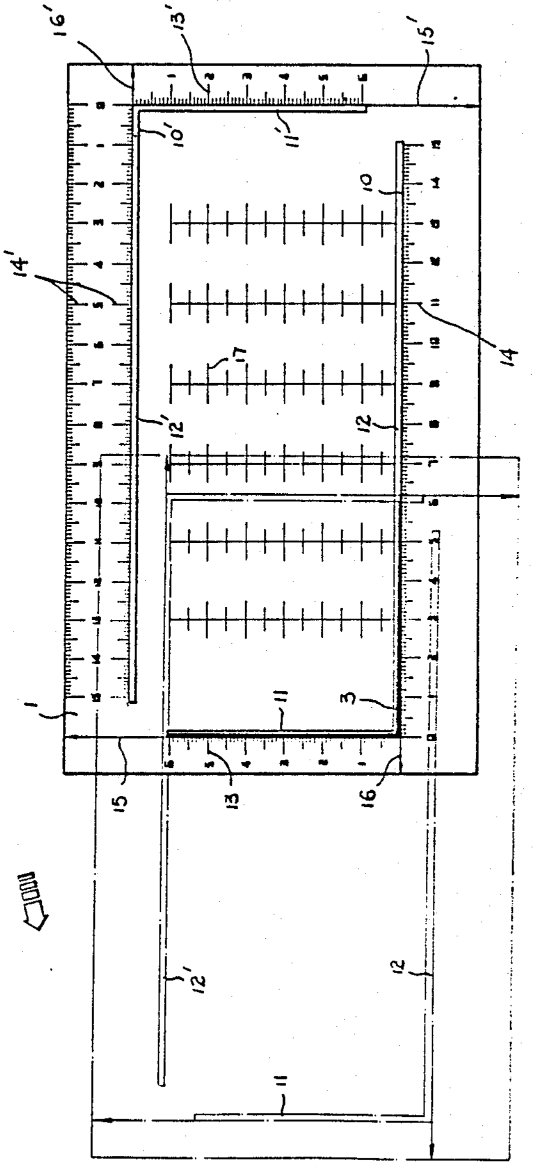
FIG. 6 is a working view of the present invention, showing how a square can be quickly and easily constructed.

Finally, referring to FIG. 6, it can be seen that perfect squares are quickly drawn (with precision) using the present invention 1. Simply draw the line 3 to the same length in both the vertical slot 11 and the horizontal slot 12. In FIG. 6, for example, both portions of line 3 are drawn to 6 centimeters. Then, using the procedure just described for forming perfectly square rectangles, a perfectly squared-off square can be drawn.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A straightedge comprising:

two continuous slots, each of which is L-shaped;

four reference arrows;

a multiplicity of central scales in a center portion of said straightedge, said central scales also being situated between said two L-shaped slots;

two horizontal measuring scales and two vertical measuring scales;

said L-shaped slots each comprising a horizontal slot and a vertical slot and also facing each other with the horizontal slots parallel to each other and the vertical slots parallel to each other;

each of said measuring scales being situated adjacent to one of said vertical or said horizontal slots;

said respective horizontal and vertical slots of each L-shaped slot forming right angles with each other, said right angles facing one another;

said reference arrows being collinear with said horizontal or vertical slots and also extending to an edge of said straightedge; and said straightedge being transparent.

2. The straightedge of claim 1, wherein said central scales constitute means for aligning lines to be drawn through said horizontal and vertical slots.

3. The straightedge of claim 2, wherein said central scales are constituted by a multiplicity of vertical lines, each vertical line being divided by several horizontal lines.

4. The straightedge of claim 3, wherein said central scales are constituted by five vertical lines.

5. The straightedge of claim 4, wherein each of said measuring scales is situated between said respective slot and the edge of said straightedge.

6. The straightedge of claim 1, wherein the edge thereof forms a rectangular perimeter thereof.

7. The straightedge of claim 5, wherein the edge thereof forms a rectangular perimeter thereof.

8. The straightedge of claim 1, wherein said right angles diagonally face one another with respect to said horizontal and vertical slots.

* * * * *